United States Patent Office 2,943,084
Patented June 28, 1960

2,943,084

NEW CHROMIFEROUS MONOAZO-DYESTUFFS

Arthur Buehler, Rheinfelden, Alfred Fasciati, Bottmingen, and Henri Riat, Arlesheim, Switzerland, assignors to Ciba Limited, Basel, Switzerland, a Swiss firm No Drawing. Filed Aug. 11, 1958, Ser. No. 754,165

Claims priority, application Switzerland Aug. 14, 1957

9 Claims. (Cl. 260—145)

This invention provides new chromiferous monoazo-dyestuffs which contain one atom of chromium bound in complex union to two molecules of different monoazo-dyestuffs, of which dyestuffs only one contains a halogen-1:3:5-triazine grouping containing at least one halogen atom and at least one of which contains an acid group imparting solubility in water, more especially a sulfonic acid group. The invention provides more especially 1:2-complex chromium compounds which contain two molecules of different dyestuffs as specified above and contain only one dichloro- or monochloro-1:3:5-triazine radical, which may be bound through a nitrogen bridge and is advantageously of the formula (1) 

in which R represents an etherified hydroxyl or mercapto group or an alkyl or aryl group or an amino group which may be substituted.

As groups imparting solubility in water there may be mentioned, for example, alkyl-sulfone groups of low molecular weight, sulfonic acid amide groups, especially the —$SO_2NH_2$ group, and above all strongly acid groups imparting solubility in water such as a carboxylic acid or sulfonic acid group. Such groups may be present in any suitable positions, for example, in the radical of the coupling component or diazo-component or in the monohalogen-triazine radical, for example, in the group R of the radical of the Formula 1.

In addition to such groups, which may be present in both or only one of the monoazo-dyestuffs present in the complex chromium compound, there must be present in one of these monoazo-dyestuffs a 2:4-dichloro-1:3:5-triazine radical or a monohalogenated triazine radical, for example, a 2-chloro-4-alkyl-, 4-aryl-, 2-chloro-4-alkoxy-, or -4-aryloxy-1:3:5-triazine radical or a radical of the Formula 1, which radical is bound to the radical of the diazo component or coupling component advantageously through an amino group of the formula

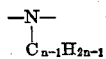

in which $n$ is a whole number, for example, 2 or 1.

The asymmetrical complex chromium compounds of this invention can be made by reacting a metal-free monoazo-dyestuff with a 1:1-complex chromium compound of the other monoazo-dyestuff to form the asymmetrical 1:2-chromium complex, and using monoazo-dyestuffs of which one, advantageously the metal-free-dyestuff contains a triazine nucleus of the kind defined above. Alternatively the said triazine radical may be incorporated into the appropriate asymmetrical chromiferous dyestuff not containing a halogen-triazine radical. For this purpose one of the three chlorine atoms in a trihalogen-triazine, especially cyanuric chloride (2:4:6-trichloro-1:3:5-triazine), may be replaced by the radical of a 1:2-complex chromium compound which contains a monoazo-dyestuff containing an acylatable mercapto or hydroxyl group or advantageously an acylatable amino group, or one of the aforesaid chromiferous dyestuffs containing an acylatable group may be condensed with a 2:4-dichloro-1:3:5-triazine which contains in the 6-position a free amino group or an organic substituent, for example, a dihalogen-triazine of the formula (2) 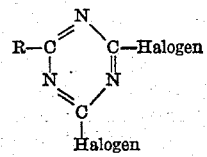

in which R represents an advantageously organic radical, for example, the condensation taking place, for example, at the acylatable group and resulting in the replacement of only one of the two halogen atoms.

The dihalogen-triazines of the Formula 2 can be made by methods in themselves known from cyanuric halides such as cyanuric bromide, or cyanuric chloride, by reacting, for example, one molecular proportion of cyanuric chloride with one molecular proportion of a reactive organic mercapto or hydroxy-compound (for example, a phenol or alcohol), or with one molecular proportion of ammonia or with one molecular proportion of an organic at most secondary and advantageously primary amine not having the character of a dyestuff and which contains at least one group imparting solubility in water, if it is to be combined with a dyestuff free from groups imparting solubility in water. As such compounds there may be mentioned, for example, aliphatic or aromatic mercapto- or hydroxy-compounds, especially lower alcohols such as methyl alcohol, or phenols, thiophenols, and also methylamine, ethylamine, isopropylamine, methoxyethylamine, methoxypropylamine, cyclohexylamine, dimethylamine, diethylamine, N-methylphenylamine, chlorethylamine, ethanolamines, piperidine, morpholine, aminocarbonic acid esters, aminoacetic acid ethyl ester, hydrazine, phenyl-hydrazine, aniline or ammonia, or, if desired, amines containing groups imparting solubility in water such as aminoethane sulfonic acid, N-methylaminoethane sulfonic acid, ortho-, meta- or para-aminobenzoic acids or sulfo-aminobenzoic acids, ortho-, meta- or para-aminobenzene sulfonic acids, aminonaphthalene sulfonic acids, for example, 2-aminonaphthalene-4:8-disulfonic acid.

The metalliferous dyestuffs, which are to be used for condensation with the primary cyanuric chloride condensation products of the Formula 2 so obtained, can be made by methods in themselves known, for example, by reacting a metallizable monoazo-dyestuff with a 1:1-complex chromium compound of a different monoazo-dyestuff, and so selecting the starting materials that the chromium-free or chromiferous monoazo-dyestuff contains an acylatable group, in addition to the grouping enabling complexes to be formed.

Mixed complex chromium compounds, which contain an acylatable amino group, can also be made by the subsequent reduction of a nitro group or hydrolysis of an acylamino group present in a complex chromium compound.

As starting materials for use in the process two different monoazo-dyestuffs are required, of which one may be an ortho:ortho'-dihydroxy-monoazo-dyestuff, an ortho-carboxy-ortho'-hydroxy-monoazo-dyestuff or an ortho-hydroxy-ortho'-amino-monoazo-dyestuff and the other is advantageously an ortho:ortho'-dihydroxy-monoamino-azo-dyestuff. There are advantageously used ortho:ortho'-dihydroxy-monoazo-dyestuffs or chromium compounds (1:1-complexes) thereof which contain one atom of chromium bound in complex union per dyestuff molecule. Alternatively, there may be used ortho-carboxy-ortho'-hydroxy-monoazo-dyestuffs or ortho-hydroxy-ortho'-amino-monoazo-dyestuffs or their 1:1-complexes.

The necessary monoazo-dyestuffs which are used in the process free from metal or in the form of 1:1-metal complexes can be made by methods in themselves known by coupling ortho-carboxy- or ortho-hydroxy-diazo-compounds, especially those of the benzene or naphthalene series, with coupling components capable of coupling in a position vicinal to a hydroxyl group or to an enolizable keto group or to an amino group. As will be understood from the foregoing description, the components advantageously contain groups imparting solubility in water. Furthermore, the components are so selected that only one of the two starting materials to be used, namely the chromiferous or chromium-free monoazo-dyestuff, contains a single acylatable group, more especially an at most secondary amino group, or a substituent subsequently convertible into such group.

Taking into account the foregoing requirements the following components, for example, may be used for making the monoazo-dyestuffs:

As diazo-compounds there are advantageously used those of ortho-carboxy-amines of the benzene series and above all those of ortho-hydroxy-amines of the benzene or naphthalene series, which contain, in addition to the carboxyl or hydroxyl group and the amino group, further substituents such as nitro groups, halogen atoms, for example, chlorine; alkyl groups, for example, methyl groups; alkoxy groups, for example, methoxy groups; or acylamino groups, especially those containing a few, for example, at most four, carbon atoms, for example, acetylamino groups; and also sulfonic acid groups. As examples of suitable diazo compounds there may be mentioned:

2-aminobenzoic acid,
5-chloro-2-aminobenzoic acid,
2-amino-1-hydroxybenzene,
4- or 5-chloro-2-amino-1-hydroxybenzene,
4-, 5- or 6-nitro-2-amino-1-hydroxybenzene,
4:6-dichloro-2-amino-1-hydroxybenzene,
3:4:6-trichloro-2-amino-1-hydroxybenzene,
4-chloro-5- or -6-nitro-2-amino-1-hydroxybenzene,
4-nitro-6-chloro-2-amino-1-hydroxybenzene,
6-nitro-4-methyl-2-amino-1-hydroxybenzene,
4-nitro-6-acetylamino-2-amino-1-hydroxybenzene,
6-nitro-4-acetylamino-2-amino-1-hydroxybenzene,
4:6-dinitro-2-amino-1-hydroxybenzene,
2-aminobenzene-1-carboxylic acid-4- or -5-sulfonic acid,
2-amino-1-hydroxybenzene-4- or 5-sulfonic acid,
4-chloro- or 4-methyl-2-amino-1-hydroxybenzene-5- or -6-sulfonic acid
4-nitro-2-amino-1-hydroxybenzene-6-sulfonic acid
6-nitro-2-amino-1-hydroxybenzene-4-sulfonic acid and above all naphthalene derivatives, such as
2-amino-1-hydroxynaphthalene-4- or -8-sulfonic acid,
6-bromo-, 6-methoxy- or 6-methyl-1-amino-2-hydroxynaphthalene-4-sulfonic acid, especially
1-amino-2-hydroxynaphthalene-4-sulfonic acid or
6-nitro-1-amino-2-hydroxynaphthalene-4-sulfonic acid.

As coupling components there may be used those capable of coupling in a position vicinal to a primary or secondary amino group or a hydroxyl group, especially aminonaphthalenes and naphthols. There are also suitable keto-compounds which are capable of coupling in a position vicinal to the enolized or enolizable keto group, especially 1-phenyl-3-methyl-5-pyrazolones.

As examples of coupling components there may be mentioned:

(a) Coupling components which contain no acylatable group after coupling:
Hydroxybenzenes, such as para-cresol or para-tertiary-amylphenol,
4-methyl-2-acetylamino-1-hydroxybenzene,
4-acetylamino-1-hydroxybenzene,
β-Ketocarboxylic acid esters or -amides, such as Acetoacetic acid anilide and
1-acetoacetylamino-2-, -3- or -4-chlorobenzene,
5-pyrazolones, such as
3-methyl-5-pyrazolone,
1-phenyl-3-methyl-5-pyrazolone,
1:3-diphenyl-5-pyrazolone,
1-(2'-, 3'- or 4'-chlorophenyl)-3-methyl-5-pyrazolone,
1-(2':5'-dichlorophenyl)-3-methyl-5-pyrazolone,
1-(2'-ethylphenyl)-3-methyl-5-pyrazolone,
1-[naphthyl-(1')- or -(2')]-3-methyl-5-pyrazolone,
1-phenyl-5-pyrazolone-3-carboxylic acid phenylamide,
1-n-octyl-3-methyl-5-pyrazolone,
Hydroxyquinolines,
Barbituric acid,
Naphthalene derivatives, such as
6-bromo-, 6-methoxy- or 6-methyl-2-aminonaphthalene,
2-phenylaminonaphthalene, 2-aminonaphthalene itself, and 2-aminonaphthalene-1-sulfonic acid which, as is known, couple to give the same dyestuffs as 2-aminonaphthalene, since the sulfonic acid group in the 1-position splits off, and also 6-bromo- or 6-methoxy-2-hydroxynaphthalene and especially
1-acetylamino-7-hydroxynaphthalene,
1-n-butyrylamino-7-hydroxynaphthalene,
1-benzoylamino-7-hydroxynaphthalene,
1-carbethoxyamino-7-hydroxynaphthalene,
8-chloro-1-hydroxynaphthalene,
5-chloro-1-hydroxynaphthalene,
5:8-dichloro-1-hydroxynaphthalene,
5:8-dichloro-2-hydroxynaphthalene,
2-hydroxynaphthalene and if desired,
1-hydroxynaphthalene,
1-phenyl-3-methyl-5-pyrazolone-2'-, -3- or -4'-sulfonic acid,
2'-chloro-1-phenyl-3-methyl-5-pyrazolone-4'- or -5'-sulfonic acid,
2':5'-dichloro-1-phenyl-3-methyl-5-pyrazolone-4'-sulfonic acid,
1-[naphthyl-(1')]-3-methyl-5-pyrazolone-4'-, -5'-, -6'-, -7'- or -8'-sulfonic acid,
1-[naphthyl-(2')]-3-methyl-5-pyrazolone-2'- or -8'-sulfonic acid,
1-acetoacetylaminobenzene-4-sulfonic acid and especially
2-amino- or 2-hydroxynaphthalene-4-, -5-, -6- or -7-sulfonic acid,
1-hydroxynaphthalene-3-, -4-, -5- or -8-sulfonic acid,
2-phenylaminonaphthalene-3'- or -4'-sulfonic acid,
2-phenylaminonaphthalene-2'-carboxylic acid,
2-phenylaminonaphthalene-6-sulfonic acid,
2-phenylamino-8-hydroxynaphthalene-6-sulfonic acid,
2-phenylamino-5-hydroxynaphthalene-6:3'-disulfonic acid.

(b) Coupling components which contain an acylatable amino group, in addition to the hydroxy or amino group permitting coupling: Resorcinol and dihydroxynaphthalenes, meta-aminophenol, 1-aryl-5-pyrazolones which contain an amino group in the aryl radical, such as 1-(2'- or -3'- or -4'-aminophenyl)-3-methyl-5-pyrazolone, 1-(3'- or 4'-aminophenyl)-5-pyrazolone-3-carboxylic acid, and also β-keto-carboxylic acid arylides containing an acylatable amino or hydroxyl group in the arylide radical, and amino-naphthol sulfonic acids, such as 2-amino-8-hydroxynaphthalene-6-sulfonic acid, 2-n-methylamino-8-hydroxynaphthalene-6-sulfonic acid, 2-alkylamino-5-hydroxynaphthalene-7-sulfonic acid, 1-amino-8-hydroxynaphthalene-3:6-disulfonic acid, 1-methylamino-8-hydroxy-naphthalene-3:6-disulfonic acid, 2-amino-5-hydroxynaphthalene-7-sulfonic acid, 2-(4'-aminobenzoylamino)-5-hydroxynaphthalene-7-sulfonic acid, 2-(4'-aminophenylamino) - 5' - hydroxynaphthalene - 3':7 - disulfonic acid. It will be understood that when diazo-components containing nitro groups or coupling components containing acylamino groups are used, the necessary acylatable groups, especially amino groups, are subsequently produced by reduction or hydrolysis. In selecting the diazo components and coupling components to be used care must be taken that only one of the dyestuffs to be used for making the complex chromium compounds of the invention should contain an acylatable group, in addition to the groups permitting the formation of complexes.

In making the 1:1-chromium complexes of ortho:ortho'-dihydroxy-monoazo-dyestuffs they can be made, as is known, not only from ortho:ortho'-dihydroxy-monoazo-dyestuffs, but also from the corresponding ortho-alkoxy-ortho'-hydroxy-monoazo-dyestuffs. For making the chromiferous starting materials to be used in the process of the invention it is normally possible to use, instead of the ortho-hydroxy-diazo-compounds, the corresponding ortho-alkoxy-diazo compounds, especially the methoxy-compounds. As certain coupling components, for example 2-hydroxynaphthalene-8-sulfonic acid and 2-aminonaphthalene-8-sulfonic acid, are not capable of coupling with ortho-hydroxy-diazo-compounds, there is the alternative of using 1:1-complexes of dyestuffs which contain the radical of such a coupling component.

The 1:1-complexes used as starting materials may, in other respects, be prepared by methods in themselves known, for example, by reacting the chromium-free monoazo-dyestuffs, advantageously those containing a sulfonic acid group, in an acid medium with an excess of a salt of trivalent chromium, such as chromium formate, chromium sulfate or chromium fluoride, at the boil or, if desired, at a temperature above 100° C.

The reaction of the 1:1-chromium complexes with the chromium-free dyestuffs may be carried out in an organic solvent, if the dyestuff contains no groups imparting solubility in water, but is advantageously carried out in an aqueous neutral to weakly alkaline medium under atmospheric or superatmospheric pressure at the ordinary or a raised temperature, for example, at a temperature within the range of 50° C. to 120° C. It is generally desirable to react with one another the chromiferous 1:1-complex and the chromium-free dyestuff in quantities that are as near as possible to equivalent quantities, the molecular ratio of metal-free dyestuff to 1:1-complex being advantageously at least 0.85:1 and at most 1:0.85. The nearer this ratio is to 1:1, the more advantageous, in general, is the result.

The condensation of these asymmetrical complex chromium compounds of monoazo-dyestuffs containing an acylatable amino group with cyanuric chloride or a dihalogentriazine compound, for example, with the compound of the Formula 2 is advantageously carried out in the presence of an acid-binding agent, such as sodium acetate, sodium hydroxide or sodium carbonate, under conditions such that the final product contains at least one exchangeable halogen atom.

In one form of this process an asymmetrical 1:2-complex chromium compound of two monoazo-dyestuffs, of which one contains an acylatable mercapto or hydroxy group and/or preferably an acylatable amino group and, if desired, an acid group imparting solubility in water, is condensed with a cyanuric halide, especially cyanuric chloride, and in the primary condensation product so obtained, which contains two exchangeable halogen atoms, a further halogen atom is reacted with ammonia or an organic mercapto or hydroxy-compound or an organic amine possessing or not possessing the character of a dyestuff in such manner that a metalliferous monoazo-dyestuff is obtained which contains one atom of chromium bound in complex union with two different monoazo-dyestuffs, of which one contains a monohalogen-triazine radical.

As hydroxy-compounds and as monamines there may be used those mentioned above in connection with the preparation of the dihalogen-triazines. As metalliferous monoazo-dyestuffs there are likewise used those mentioned above, and the preparation and working up of the dyestuff condensation products is carried out in such manner that the isolated product contains a reactive halogen atom, that is to say, in an aqueous medium at as low a temperature as possible and in the presence of an acid-binding agent or if desired in an organic solvent.

In another form of the process the condensation with cyanuric chloride or with one of the aforesaid 2:4-dihalogen-1:3:5-triazines, for example, a dihalogen-triazine compound of the Formula 2, may be carried out before reacting the chromium-free monoazo-dyestuff with the chromiferous monoazo-dyestuff provided that these dyestuffs react with one another so readily to form the 1:2-complex that the halogen present in the triazine nucleus in one of the dyestuffs is not attacked.

The dyestuffs of this invention, which are new, are valuable dyestuffs and are suitable for dyeing or printing a very wide variety of materials such as wool, superpolyamides, silk, leather, and especially polyhydroxylated materials of fibrous structure such as cellulosic materials and also synthetic fibers, for example, of regenerated cellulose, or natural materials such as cellulose, linen or especially cotton. They are suitable for dyeing cellulose fibers by the so-called direct dyeing methods from long liquors consisting of alkaline aqueous baths, which may have a high concentration of salt, and especially by printing and so-called pad dyeing processes, in which the dyestuff is applied to the material to be dyed by printing or padding and the dyestuff is fixed on the material by means of an acid-binding agent.

The dyestuffs can be isolated, advantageously at a low temperature, by salting out and filtration. The filtered dyestuff, if desired, after the addition of an extender, and a buffer, may be dried. The drying is advantageously carried out at not too high a temperature and under reduced pressure. In certain cases the reaction mixture in which the dyestuff is produced may be subjected to spray drying so as to yield a dry preparation directly, that is to say, without first isolating the dyestuff. By these methods valuable new dry preparations are obtained, which the dyestuff is produced may be subjected to spray baths and, if desired, printing pastes.

The dyeings produced on cellulosic fibers with the dyestuffs of this invention are generally distinguished by their good fastness to light and especially by their excellent fastness to washing.

The following examples illustrate the invention; the parts and percentages being by weight.

In these examples "1 mol" is used in its usual sense to denote the molecular weight in grams. It will be understood that the quantities used can be increased, for example, by 10 or 1000 times, without difficulty. If the dyestuffs used as starting materials are not in a pure form, for example, are not closely defined dyestuff acids or dyestuff salts, but contain foreign substances, for example, resulting from precipitation by salting out, and which substances have substantially no harmful effect on the reaction in question, the dyestuffs can generally be successfully used in that form. However, it is then desirable to determine their content of pure dyestuff by any known method, for example, by the titration of azo groups.

Example 1

0.02 mol of the complex chromium compound containing one atom of chromium per molecule of the dyestuff from 6-nitro-1-diazo-2-hydroxynaphthalene-4-sulfonic acid and 2-hydroxynaphthalene is heated to 90° C. with 0.02 mol of the dyestuff obtained by coupling diazotized 5-nitro-2-amino-1-hydroxybenzene in an alkaline medium with 2-amino-5-hydroxynaphthalene-7-sulfonic acid, in 400 cc. of water with the gradual addition of 20 cc. of a 2 N-solution of sodium carbonate, and the mixture is maintained at 90° C. for about one hour.

The resulting solution of the mixed chromium complex after being cooled with ice to 0° C., is mixed with a solution of 3.7 grams of cyanuric chloride in 25 cc. of acetone. The condensation is carried out at 0–5° C. with the gradual addition of about 10 cc. of a 2 N-solution of sodium hydroxide so as to maintain the pH value of the reaction mixture throughout at about 6.5–7.

The resulting solution of the dichloro-triazine derivative is saturated with sodium chloride, the precipitated metalliferous dyestuff is filtered off, and the filter cake, after being mixed with 5 grams of a mixture of equal parts of monosodium and disodium phosphate, is dried at 30–40° C. in vacuo. There is obtained a dark powder that is easily soluble in water, and dyes cotton and regenerated cellulose by the method described in Example 4 strong grey tints which are fast to washing.

In the following table are set out in column I the azo dyestuffs of which 1:1-complex chromium compounds are reacted with the azo dyestuffs mentioned in column II to form mixed chromium complexes. In column III are given the tints of dyeings produced with the dichorotriazine derivatives obtainable from the mixed complexes.

Example 2

A solution of the dichlorotriazine derivative obtained as described in the first two paragraphs of Example 1 is mixed with 30 cc. of a 2 N-solution of ammonia, and the mixture is heated in a flask provided with an ascending tube for 4 hours at 35–40° C. There is obtained an amino-monochlorotriazine derivative which can be isolated by salting out and filtration. After drying the dyestuff so obtained, it is a grey powder which when used for dyeing cotton in the manner described in Example 4 produces a grey dyeing which is fast to light.

| | I | II | III |
|---|---|---|---|
| 1 | (structure) | (structure) | grey. |
| 2 | (structure) | (structure) | reddish navy blue. |
| 3 | (structure) | (structure) | blue green. |
| 4 | (structure) | (structure) | red. |
| 5 | (structure) | (structure) | brown. |

In an analogous manner the monoazo-dyestuffs named in column I of the following table are converted into 1:1-complex chromium compounds, and the latter are reacted with the dyestuffs named in column II to form mixed chromium complexes. The latter are reacted with cyanuric chloride to give dichlorotriazine derivatives, which are reacted with the compounds named in column III to yield monochlorotriazine derivatives which dye cellulose fibers the tints given in column IV.

| | I | II | III | IV |
|---|---|---|---|---|
| 1 | [structure: OH, O₂N-phenyl-N=N-naphthyl-NH₂, SO₃H] | [structure: OH, O₂N-phenyl-N=N-naphthyl(OH, HO₃S)-NH₂] | H₂N-phenyl-SO₃H | greenish grey. |
| 2 | [structure: HO₃S-phenyl(OH, NO₂)-N=N-C(pyrazolone with phenyl, CH₃)] | [structure: similar with phenyl-NH₂] | H₂N-phenyl-SO₃H | orange. |
| 3 | [structure: HO₃S-naphthyl(OH)-N=N-C(pyrazolone with phenyl, CH₃)] | [structure: similar with phenyl-NH₂, NO₂] | H₂N-phenyl-SO₃H (ortho) | red. |
| 4 | [structure: HO₃S-naphthyl(OH)-N=N-naphthyl(OH)] | [structure: O₂N-phenyl(OH)-N=N-naphthyl(OH, HO₃S)-NH₂] | H₂N-phenyl-SO₃H | greenish grey. |
| 5 | [structure: HO₃S-naphthyl(OH)-N=N-C(pyrazolone with phenyl, CH₃)] | [structure: HN-COCH₃, NO₂, phenyl(OH)-N=N-C(pyrazolone-phenyl-NH₂, CH₃)] | H₂N-phenyl-SO₃H (ortho) | brownish red. |
| 6 | [structure: HO₃S-naphthyl(OH)-N=N-C(pyrazolone with phenyl, CH₃)] | [structure: HN-COCH₃, NO₂, phenyl(OH)-N=N-C(pyrazolone-phenyl-NH₂, CH₃)] | Ammonia | Do. |
| 7 | [structure: HO₃S-naphthyl(OH, NO₂)-N=N-naphthyl(OH)] | [structure: HO₃S-phenyl(OH)-N=N-naphthyl(OH, HO₃S)-NH₂] | H₂N-phenyl | greenish grey. |

| | I | II | III | IV |
|---|---|---|---|---|
| 8 | | | Ammonia | grey. |
| 9 | | | Ammonia | greenish grey. |
| 10 | | | H₂N—⌬(COOH)—SO₃H | violetish brown. |
| 11 | | | H₂N—⌬(SO₃H)—SO₃H | brown. |
| 12 | | | ⌬(NH₂)—COOH | grey. |
| 13 | | | Ammonia | reddish grey. |
| 14 | | | do | bluish green. |
| 15 | | | do | orange. |

| | I | II | III | IV |
|---|---|---|---|---|
| 16 | [structure: naphthalene with OH, HO₃S, N=N-C(OH)=N-C(=N)-CH₃ with phenyl on N (pyrazolone-phenyl)] | [structure: HO₃S-naphthol—N=N—naphthol(HO₃S)(OH)—NH₂ with NO₂] | $C_2H_5$—$NH_2$ | grey. |
| 17 | [structure: naphthalene with OH, HO₃S, N=N-C(OH)=N-C(=N)-CH₃ with phenyl (pyrazolone-phenyl)] | [structure: HO₃S-naphthol—N=N—naphthol(HO₃S)(OH)—NH₂ with NO₂] | HO—$C_2H_4$—$NH_2$ | reddish grey. |
| 18 | [structure: HO₃S-naphthol—N=N—naphthol with NO₂] | [structure: HO₃S-naphthol—N=N—naphthol(HO₃S)(OH)—NH₂ with NO₂] | morpholine: O(CH₂CH₂)₂NH | greenish grey. |
| 19 | [structure: HO₃S-naphthol—N=N—naphthol with NO₂] | [structure: HO₃S-naphthol—N=N—naphthol(HO₃S)(OH)—NH₂] | $CH_3O$—$CH_2$—$CH_2$—$CH_2$—$NH_2$ | Do. |

*Example 3*

A solution in acetone of 3.7 parts of cyanuric chloride is added to an ice-cold neutralized aqueous solution of 3.46 parts of 1-aminobenzene-3-sulfonic acid, and the mixture is neutralized by the gradual addition of a dilute solution of sodium hydroxide to neutralise the acid liberated. When amino groups can no longer be detected, there is added to the solution of the resulting primary condensation product a neutral solution of the 1:2-chromium mixed complex obtained as described in the first paragraph of Example 1 and, after the addition of 2 parts of sodium bicarbonate, the whole is heated for 2–4 hours at 30° C. The monochlorotriazine dyestuff so formed is precipitated by the addition of sodium chloride, and filtered off and dried. It dyes cotton grey tints.

For making the primary condensation product there may be used, instead of 1-aminobenzene-3-sulfonic acid, other amines for example, 1-aminobenzene-2-sulfonic acid, 1-aminobenzene-2-carboxylic acid, 1-aminobenzene-2:5-disulfonic acid or 2-aminonaphthalene-4:8-disulfonic acid, whereby dyestuffs having similar properties are obtained.

*Example 4*

0.1 mol of the complex chromium compound containing one atom of chromium per molecule of dyestuff and obtained from the dyestuff obtained from 6-nitro-1-diazo-2-hydroxynaphthalene-4-sulfonic acid and 2-hydroxynaphthalene is dissolved in 2000 parts of water with 0.1 mol of the dyestuff obtained by coupling diazotized 5-nitro-2-amino-1-hydroxybenzene in an alkaline medium with 2-phenylamino-8-hydroxynaphthalene-6:3′-disulfonic acid followed by reduction of the nitro group to the amino group by means of sodium sulfide, and the solution is neutralized with sodium carbonate. The mixture is then heated in the course of ½ hour to 80–90° C., care being taken by the addition of sodium carbonate that the dyestuff solution has a weakly alkaline reaction. The whole is maintained for one hour at 80° C., during which the pH value of the solution no longer changes. The cooled solution of the resulting 1:2-chromium complex is added to a fine aqueous ice-cold suspension of 18.5 parts of cyanuric chloride in 400 parts of water, and the reaction of the mixture is maintained neutral by the gradual addition of dilute caustic soda solution. When the condensation is finished, there are added 50 parts of an ammonia solution of 10% strength and the whole is stirred for 2 hours at 40° C., during which one chlorine atom is replaced by a free amino group. The dyestuff formed is salted out, and separated by filtration and dried.

It dyes cotton by the method described in Example 5 reddish grey tints.

By condensing at 40° C. 18 parts of 2:4-dichloro-6-methoxy-1:3:5-triazine, which has been dissolved in 100 parts of acetone, with the neutral solution of the 1:2-mixed chromium complex obtained as described in the first paragraph of this example, the reaction mixture being maintained neutral by the gradual addition of a dilute solution of sodium hydroxide, there is obtained a monochlorotriazine dyestuff which likewise dyes cotton reddish grey tints which are fast to washing.

A dyestuff having similar properties is obtained by using 24.3 parts of 2:4-dichloro-6-phenoxy-1:3:5-triazine, instead of 18 parts of 2:4-dichloro-6-methoxy-1:3:5-triazine. In this case the condensation is advantageously carried out in aqueous acetone.

Example 5

1 part of the dyestuff obtained as described in Example 4 is dissolved in 100 parts of water. A cotton fabric is impregnated with the solution on a foulard and then squeezed to remove the excess liquid until it retains 75% of its weight of dyestuff solution. The impregnated material is dried, then impregnated at room temperature in a solution containing, per liter, 10 grams of sodium hydroxide and 300 grams of sodium chloride, the material is squeezed to a weight increase of 75%, and then steamed for 60 seconds at 100–101° C. The material is then rinsed and the dyeing is treated with water at the boil for ¼ hour, and then rinsed in the cold and dried. There is obtained a reddish grey dyeing which is fixed fast to light.

What is claimed is:

1. A complex chromium compound containing one atom of chromium bound in complex union with two molecules of different monoazo dyestuffs of which one corresponds to the formula $HO-R-N=N-R_1$ wherein R represents a naphthalene radical bound to the azo linkage in vicinal position to the hydroxyl group, and $R_1$ represents a 2-hydroxynaphthalene radical bound to the azo linkage in position 1 and the other is a member selected from the group consisting of dyestuffs corresponding to the formula

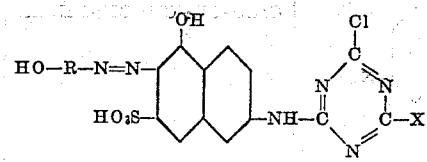

and dyestuffs corresponding to the formula

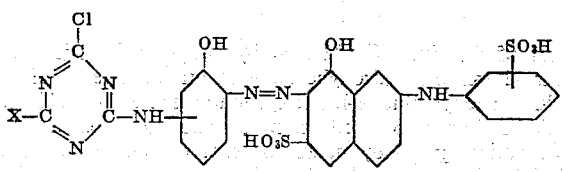

wherein R represents a member selected from the group consisting of a benzene and a naphthalene radical bound to the azo linkage in vicinal position to the hydroxyl group and X represents a member selected from the group consisting of Cl, an $NH_2$ group, the aminobenzene radical $C_6H_5NH-$, the radical of an aminobenzene sulfonic acid bound by its amino group, and the radical of an aminobenzoic acid bound by its amino group.

2. A complex chromium compound containing one atom of chromium bound in complex union with two molecules of different monoazo dyestuffs of which one corresponds to the formula

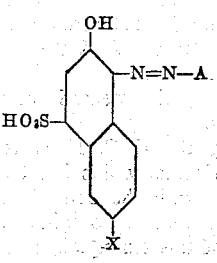

wherein A represents a member selected from the group consisting of 2-hydroxy-naphthalene bound to the azo linkage in 1-position, and 1-phenyl-3-methyl-5-pyrazolone bound in 4-position to the azo linkage and X is a member of the group consisting of hydrogen and the group $NO_2$ and the other corresponds to the formula

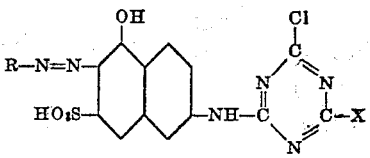

wherein R represents a member selected from the group consisting of a nitrated benzene radical bound to the azo linkage in a position vicinal to a hydroxyl group and the radical of a 6-nitro-2-hydroxy-naphthalene sulfonic acid bound to the azo linkage in 1-position and X represents a member selected from the group consisting of an $NH_2$ group, the radical of an amino-benzene sulfonic acid bound by its amino group, and the radical of an aminobenzoic acid bound by its amino group.

3. A complex chromium compound containing one atom of chromium bound in complex union with two molecules of two different monoazo dyestuffs of which one corresponds to the formula

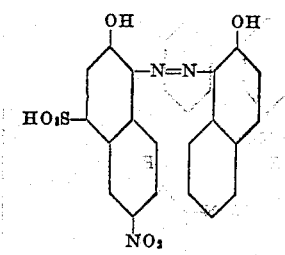

and the other corresponds to the formula

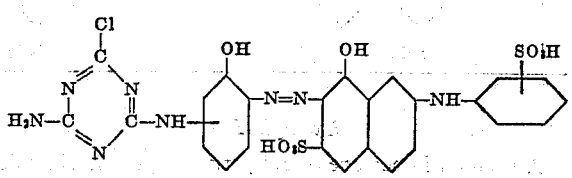

4. The complex chromium compound containing one atom of chromium bound in complex union with one molecule of each of the monoazo dyestuffs of the formulae

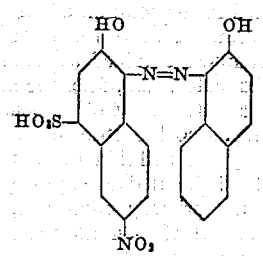

and

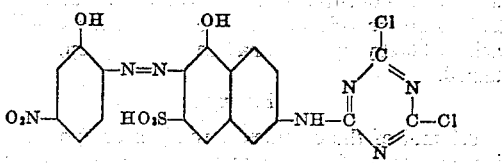

5. The complex chromium compound containing one atom of chromium bound in complex union with one molecule of each of the monoazo dyestuffs of the formulae

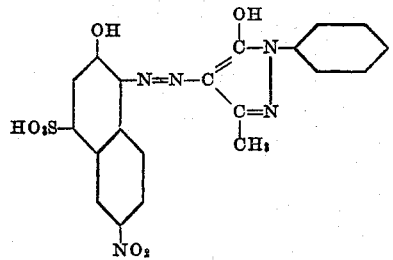

and

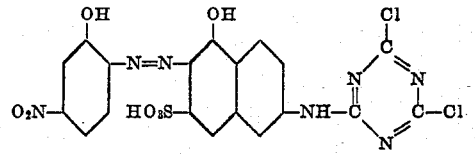

6. The complex chromium compound containing one atom of chromium bound in complex union with one molecule of each of the monoazo dyestuffs of the formulae

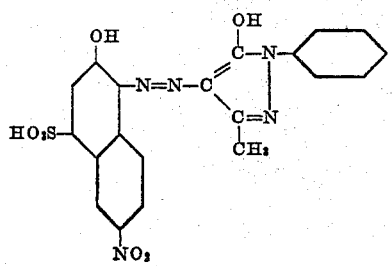

and

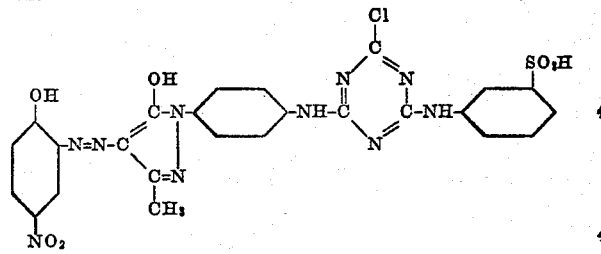

7. The complex chromium compound containing one atom of chromium bound in complex union with one molecule of each of the monoazo dyestuffs of the formulae

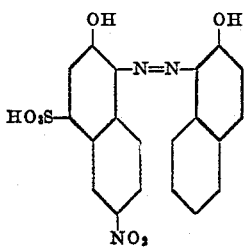

and

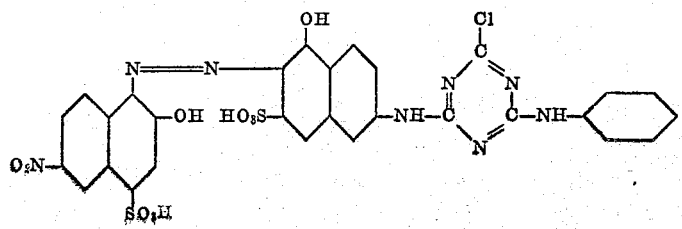

8. The complex chromium compound containing one atom of chromium bound in complex union with one molecule of each of the monoazo dyestuffs of the formulae

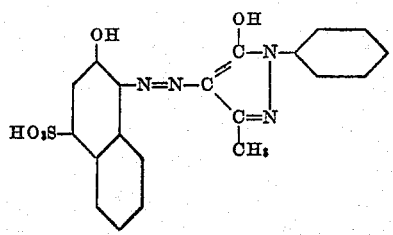

and

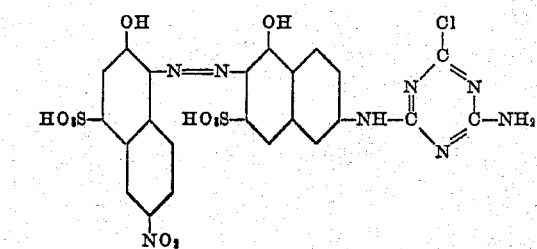

9. The complex chromium compound containing one atom of chromium bound in complex combination with one molecule of each of the monoazo dyestuffs of the formulae

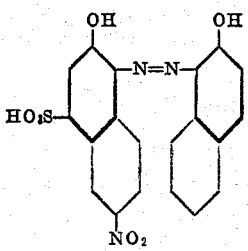

and

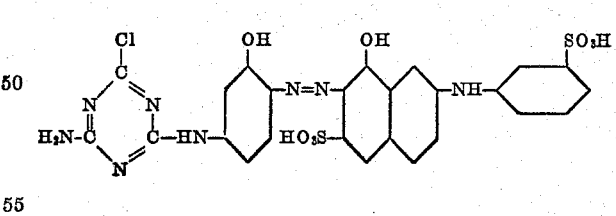

References Cited in the file of this patent
UNITED STATES PATENTS

| | | |
|---|---|---|
| 1,779,298 | Straud et al. | Oct. 21, 1930 |
| 2,012,779 | Straud et al. | Aug. 27, 1935 |